(12) United States Patent
Yang et al.

(10) Patent No.: US 11,762,957 B2
(45) Date of Patent: Sep. 19, 2023

(54) RGB-D FUSION INFORMATION-BASED OBSTACLE TARGET CLASSIFICATION METHOD AND SYSTEM, AND INTELLIGENT TERMINAL

(71) Applicant: Beijing Smarter Eye Technology Co. Ltd., Beijing (CN)

(72) Inventors: Chao Yang, Beijing (CN); An Jiang, Beijing (CN); Ran Meng, Beijing (CN); Hua Chai, Beijing (CN); Feng Cui, Beijing (CN)

(73) Assignee: Beijing Smarter Eye Technology Co. Ltd., Beijing (CN)

( * ) Notice: Subject to any disclaimer, the term of this patent is extended or adjusted under 35 U.S.C. 154(b) by 255 days.

(21) Appl. No.: 17/400,574

(22) Filed: Aug. 12, 2021

(65) Prior Publication Data

US 2022/0309297 A1  Sep. 29, 2022

(30) Foreign Application Priority Data

Mar. 24, 2021  (CN) .......................... 202110314425.X

(51) Int. Cl.
| | | |
|---|---|---|
| G06T 7/50 | (2017.01) | |
| G06F 18/25 | (2023.01) | |
| G06T 7/90 | (2017.01) | |
| G06V 20/58 | (2022.01) | |

(52) U.S. Cl.
CPC .......... *G06F 18/254* (2023.01); *G06F 18/253* (2023.01); *G06T 7/50* (2017.01); *G06T 7/90* (2017.01); *G06V 20/58* (2022.01); *G06T 2207/10024* (2013.01); *G06T 2207/10028* (2013.01)

(58) Field of Classification Search
CPC ...... G06F 18/254; G06F 18/253; G06F 18/23; G06F 18/24; G06F 18/251; G06T 7/50; G06T 7/90; G06T 2207/10024; G06T 2207/10028; G06V 20/58; G06V 10/803; G06V 10/255
USPC ........................................................ 382/103
See application file for complete search history.

(56) References Cited

U.S. PATENT DOCUMENTS

| | | | |
|---|---|---|---|
| 9,600,923 B2 * | 3/2017 | Redmann | G06T 15/04 |
| 2006/0193509 A1 * | 8/2006 | Criminisi | G06V 40/164 |
| | | | 382/154 |
| 2019/0158813 A1 * | 5/2019 | Rowell | H04N 13/111 |
| 2019/0208181 A1 * | 7/2019 | Rowell | H04N 9/8715 |

(Continued)

*Primary Examiner* — Ali Bayat
(74) *Attorney, Agent, or Firm* — NKL Law; Allen Xue

(57) ABSTRACT

An RGB-D fusion information-based obstacle target classification method includes: collecting an original image through a binocular camera within a target range, and acquiring a disparity map of the original image; collecting a color-calibrated RGB image through a reference camera of the binocular camera within the target range; acquiring an obstacle target through disparity clustering in accordance with the disparity map and the color-calibrated RGB image, and acquiring a target disparity map and a target RGB image of the obstacle target; calculating depth information about the obstacle target in accordance with the target disparity map; and acquiring a classification result of the obstacle target through RGB-D channel information fusion in accordance with the depth information and the target RGB image.

10 Claims, 2 Drawing Sheets

(56) References Cited

U.S. PATENT DOCUMENTS

2019/0295282 A1\* 9/2019 Smolyanskiy .......... G06F 18/22
2019/0318487 A1\* 10/2019 Lin .......................... G06T 7/13

\* cited by examiner

RGB-D FUSION INFORMATION-BASED OBSTACLE TARGET CLASSIFICATION METHOD AND SYSTEM, AND INTELLIGENT TERMINAL

TECHNICAL FIELD

The present disclosure relates to the field of automatic driving technology, in particular to an RGB-D fusion information-based obstacle target classification method, an RGB-D fusion information-based obstacle target classification system, and an intelligent terminal.

BACKGROUND

Along with the development of the automatic driving technology, the security and comfort level of a vehicle are increasingly demanded. In addition, along with the development of the deep learning technology, a deep learning-based recognition method has been widely applied in autonomous driving, security and industrial detection. Especially in assistant driving, categories of different obstacles need to be recognized so as to determine a driving direction, thereby to provide underlying data for a subsequent functional strategy. However, in a current classification method, a grayscale image and an RGB image are inputted, and a recognition effect of the obstacle is deteriorated in a special environment, e.g., a backlighting or dark environment, so the recognition accuracy of the obstacle is adversely affected.

SUMMARY

An object of the present disclosure is to provide an RGB-D fusion information-based obstacle target classification method, an RGB-D fusion information-based obstacle target classification system, and an intelligent terminal, so as to solve the problem in the related art where the recognition effect and the recognition accuracy are deteriorated in a special light environment.

In one aspect, the present disclosure provides in some embodiments an RGB-D fusion information-based obstacle target classification method, including: collecting an original image through a binocular camera within a target range, and acquiring a disparity map of the original image; collecting a color-calibrated RGB image through a reference camera of the binocular camera within the target range; acquiring an obstacle target through disparity clustering in accordance with the disparity map and the color-calibrated RGB image, and acquiring a target disparity map and a target RGB image of the obstacle target; calculating depth information about the obstacle target in accordance with the target disparity map; and acquiring a classification result of the obstacle target through RGB-D channel information fusion in accordance with the depth information and the target RGB image.

In a possible embodiment of the present disclosure, the acquiring the obstacle target through disparity clustering in accordance with the disparity map and the color-calibrated RGB image includes: selecting active disparity points in the disparity map; calculating a disparity value of each active disparity point; and acquiring a rectangular region for the obstacle target in accordance with an aggregation level of the disparity values.

In a possible embodiment of the present disclosure, the acquiring the classification result of the obstacle target through RGB-D channel information fusion in accordance with the depth information and the target RGB image includes: acquiring three-dimensional coordinates of the obstacle in the rectangular region, and acquiring a relative depth value of the obstacle relative to the binocular camera; acquiring a width and a height of the obstacle in a world coordinate system in accordance with a disparity map in the rectangular region and the relative depth value, so as to acquire a real width and a real height of the obstacle; and comparing the real width and the real height of the obstacle with pre-stored data, selecting a category in candidate categories matching the pre-stored data as the classification result, and outputting the classification result.

In a possible embodiment of the present disclosure, the candidate categories are acquired through: acquiring RGB-D data about the obstacle in accordance with the relative depth value of the obstacle; splicing the RGB-D data about the obstacle into a tensor with four channels, and adjusting a resolution of the RGB-D image to be a resolution matching a classification model to complete channel fusion; and outputting a confidence level of each category with respect to each obstacle, ranking the confidence levels, and selecting the categories with first two confidence levels as the candidate categories.

In a possible embodiment of the present disclosure, the classification model includes: an input layer with input dimensions of width*height*the quantity of channels, each of the width and the height being 64, and the quantity of channels being 4; a feature extraction backbone network configured to extract a feature; and a classifier configured to recognize the categories, the categories including large-size vehicle, medium-size vehicle, small-size vehicle, cyclist and pedestrian.

In a possible embodiment of the present disclosure, the feature extraction backbone network is resnet18, and the classifier is softmax.

In a possible embodiment of the present disclosure, prior to splicing the RGB-D data about the obstacle into the tensor with four channels and adjusting the resolution of the RGB-D image to be the resolution matching the classification model to complete channel fusion, the method further includes converting the relative depth value of the obstacle and the color channel into 8-bit data, so as to perform normalization on a depth map.

In another aspect, the present disclosure provides in some embodiments an RGB-D fusion information-based obstacle target classification system for the above-mentioned method, including: a disparity map acquisition unit configured to collect an original image through a binocular camera within a target range, and acquire a disparity map of the original image; an RGB image acquisition unit configured to collect a color-calibrated RGB image through a reference camera of the binocular camera within the target range; an obstacle determination unit configured to acquire an obstacle target through disparity clustering in accordance with the disparity map and the color-calibrated RGB image, and acquire a target disparity map and a target RGB image of the obstacle target; a depth information acquisition unit configured to calculate depth information about the obstacle target in accordance with the target disparity map; and a classification result acquisition unit configured to acquire a classification result of the obstacle target through RGB-D channel information fusion in accordance with the depth information and the target RGB image.

In yet another aspect, the present disclosure provides in some embodiments an intelligent terminal, including a data collection device, a processor and a memory. The data collection device is configured to collect data, the memory is configured to store therein one or more program instructions, and the processor is configured to execute the one or more program instructions for implementing the above-mentioned method.

In still yet another aspect, the present disclosure provides in some embodiments a computer-readable storage medium storing therein one or more program instructions for implementing the above-mentioned method.

According to the embodiments of the present disclosure, the original image is collected through the binocular camera within the target range, so as to acquire the disparity map of the original image. Next, the color-calibrated RGB image is collected through the reference camera of the binocular camera within the target range. Next, the obstacle target is acquired through disparity clustering in accordance with the disparity map and the color-calibrated RGB image, and the target disparity map and the target RGB image of the obstacle target are acquired. Next, the depth information about the obstacle target is calculated in accordance with the target disparity map. Then, the classification result of the obstacle target is acquired through RGB-D channel information fusion in accordance with the depth information and the target RGB image. In this way, the RGB image and the depth information are fused and inputted into the classification model, so as to prevent the failure of the classification model in a special scenario, and improve the robustness of the classification model. In addition, the categories are selected in accordance with a similarity level between an apriori size and a spatial size of the obstacle, so it is able to further prevent the pedestrian and vehicle from being recognized erroneously, thereby to solve the problem in the related art where the recognition effect and the recognition accuracy are deteriorated in a special light environment.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

The structure, scale and size shown in the drawings are merely provided to facilitate the understanding of the contents disclosed in the description but shall not be construed as limiting the scope of the present disclosure, so they has not substantial meanings technically. Any modification on the structure, any change to the scale or any adjustment on the size shall also fall within the scope of the present disclosure in the case of not influencing the effects and the purposes of the present disclosure.

DETAILED DESCRIPTION

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

An object of the present disclosure is to provide an obstacle target classification method and an obstacle target classification system on the basis of RGB-D fusion information. Three-dimensional information about a target in a physical space and color profile information in a color space are fused as input data of a classification model. As a result, it is able to prevent a recognition effect of the classification model from being deteriorated in the case of a bad lighting condition, thereby to ensure the accuracy and timeliness when classifying the obstacle, and provide reliable data for a subsequent functional strategy in autonomous or auxiliary driving.

Figure 1:
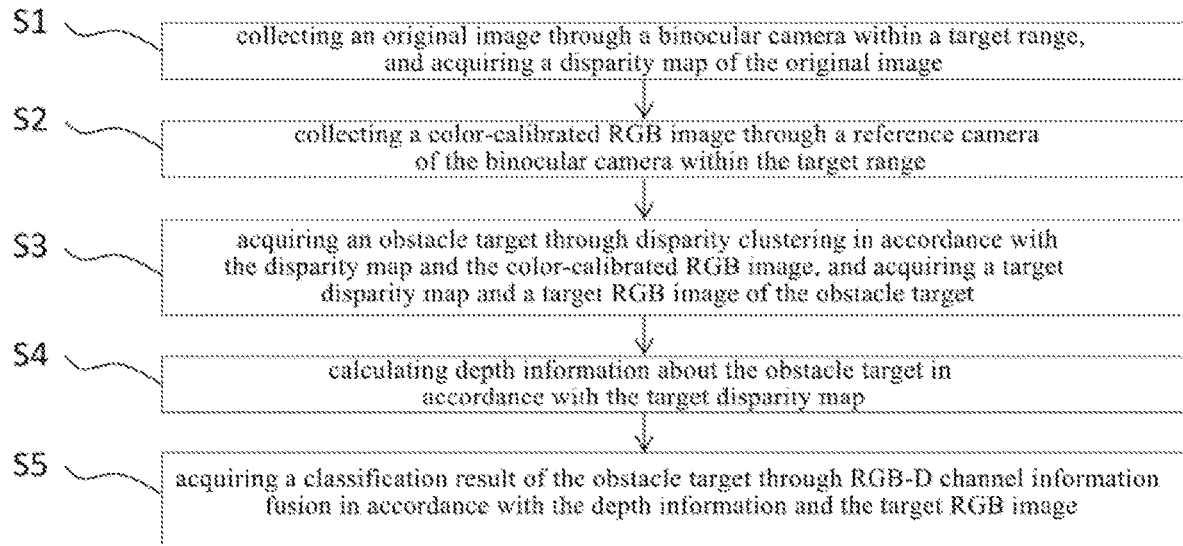
FIG. 1 is a flow chart of an obstacle target classification method according to one embodiment of the present disclosure.

The present disclosure provides in some embodiments an RGB-D fusion information-based obstacle target classification method, which, as shown in FIG. 1, includes the following steps.

S1: collecting an original image through a binocular camera within a target range, and acquiring a disparity map of the original image. In other words, the original image is acquired through each of a left-eye camera and a right-eye camera of the binocular camera, and then the disparity map of the original image is acquired through binocular stereo matching.

S2: collecting a color-calibrated RGB image through a reference camera of the binocular camera within the target range. The reference camera may be the left-eye camera or the right-eye camera of the binocular camera. In the embodiments of the present disclosure, the left-eye camera is taken as an example of the reference camera.

S3: acquiring an obstacle target through disparity clustering in accordance with the disparity map and the color-calibrated RGB image, and acquiring a target disparity map and a target RGB image of the obstacle target. To be specific, when acquiring the obstacle target through disparity clustering, at first active disparity points are selected in the disparity map. Next, a disparity value of each active disparity point is calculated, and then a rectangular region for the obstacle target is acquired in accordance with an aggregation level of the disparity values.

S4: calculating depth information about the obstacle target in accordance with the target disparity map.

S5: acquiring a classification result of the obstacle target through RGB-D channel information fusion in accordance with the depth information and the target RGB image.

Figure 2:
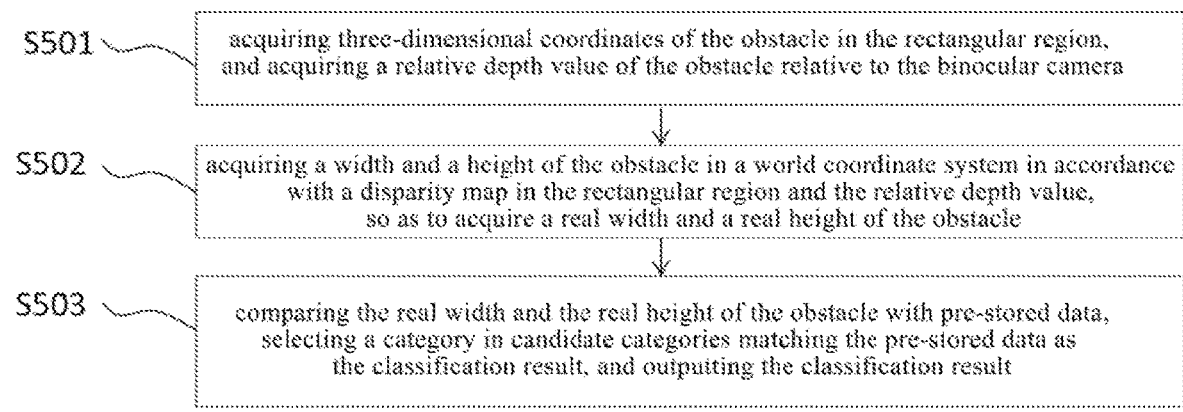
FIG. 2 is a flow chart of a process of acquiring a classification result according to one embodiment of the present disclosure.

In order to improve the accuracy of the classification result, as shown in FIG. 2, S5 of acquiring the classification result of the obstacle target through RGB-D channel information fusion in accordance with the depth information and the target RGB image includes: S501 of acquiring three-dimensional coordinates of the obstacle in the rectangular region, and acquiring a relative depth value of the obstacle relative to the binocular camera; S502 of acquiring a width and a height of the obstacle in a world coordinate system in accordance with a disparity map in the rectangular region and the relative depth value, so as to acquire a real width and a real height of the obstacle; and S503 of comparing the real width and the real height of the obstacle with pre-stored data, selecting a category in candidate categories matching the pre-stored data as the classification result, and outputting the classification result. The candidate categories are acquired through: acquiring RGB-D data about the obstacle in accordance with the relative depth value of the obstacle;

splicing the RGB-D data about the obstacle into a tensor with four channels, and adjusting a resolution of the RGB-D image to be a resolution matching a classification model to complete channel fusion; and outputting a confidence level of each category with respect to each obstacle, ranking the confidence levels, and selecting the categories with first two confidence levels as the candidate categories.

The classification model includes: an input layer with input dimensions of width*height*the quantity of channels, each of the width and the height being 64, and the quantity of channels being 4; a feature extraction backbone network configured to extract a feature; and a classifier configured to recognize the categories, the categories including large-size vehicle, medium-size vehicle, small-size vehicle, cyclist and pedestrian. The feature extraction backbone network is resnet18, and the classifier is softmax.

In order to improve an image effect, prior to splicing the RGB-D data about the obstacle into the tensor with four channels and adjusting the resolution of the RGB-D image to be the resolution matching the classification model to complete channel fusion, the method further includes converting the relative depth value of the obstacle and the color channel into 8-bit data, so as to perform normalization on a depth map.

According to the method in the embodiments of the present disclosure, the original image is collected through the binocular camera within the target range, so as to acquire the disparity map of the original image. Next, the color-calibrated RGB image is collected through the reference camera of the binocular camera within the target range. Next, the obstacle target is acquired through disparity clustering in accordance with the disparity map and the color-calibrated RGB image, and the target disparity map and the target RGB image of the obstacle target are acquired. Next, the depth information about the obstacle target is calculated in accordance with the target disparity map. Then, the classification result of the obstacle target is acquired through RGB-D channel information fusion in accordance with the depth information and the target RGB image. In this way, the RGB image and the depth information are fused and inputted into the classification model, so as to prevent the failure of the classification model in a special scenario, and improve the robustness of the classification model. In addition, the categories are selected in accordance with a similarity level between an apriori size and a spatial size of the obstacle, so it is able to further prevent the pedestrian and vehicle from being recognized erroneously, thereby to solve the problem in the related art where the recognition effect and the recognition accuracy are deteriorated in a special light environment.

Figure 3:
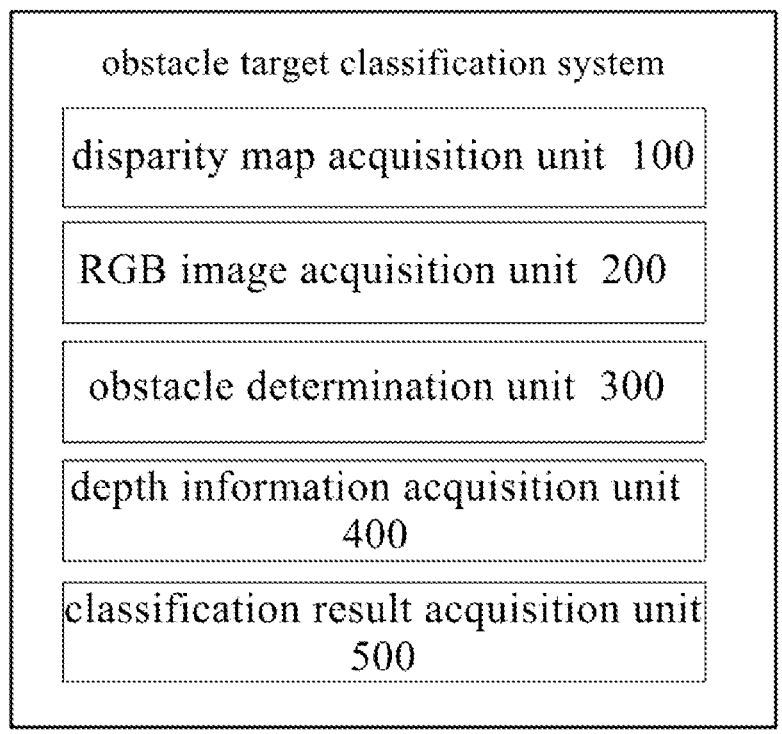
FIG. 3 is a block diagram of an obstacle target classification system according to one embodiment of the present disclosure.

The present disclosure further provides an RGB-D fusion information-based obstacle target classification system for the above-mentioned method, which, as shown in FIG. 3, includes a disparity map acquisition unit 100, an RGB image acquisition unit 200, an obstacle determination unit 300, a depth information acquisition unit 400, and a classification result acquisition unit 500.

The disparity map acquisition unit 100 is configured to collect an original image through a binocular camera within a target range, and acquire a disparity map of the original image. In an actual scenario, the original image is acquired through each of a left-eye camera and a right-eye camera of the binocular camera, and then the disparity map of the original image is acquired through binocular stereo matching.

The RGB image acquisition unit 200 is configured to collect a color-calibrated RGB image through a reference camera of the binocular camera within the target range. The reference camera may be the left-eye camera or the right-eye camera of the binocular camera. In the embodiments of the present disclosure, the left-eye camera is taken as an example of the reference camera.

The obstacle determination unit 300 is configured to acquire an obstacle target through disparity clustering in accordance with the disparity map and the color-calibrated RGB image, and acquire a target disparity map and a target RGB image of the obstacle target. To be specific, when acquiring the obstacle target through disparity clustering, at first active disparity points are selected in the disparity map. Next, a disparity value of each active disparity point is calculated, and then a rectangular region for the obstacle target is acquired in accordance with an aggregation level of the disparity values.

The depth information acquisition unit 400 is configured to calculate depth information about the obstacle target in accordance with the target disparity map.

The classification result acquisition unit 500 is configured to acquire a classification result of the obstacle target through RGB-D channel information fusion in accordance with the depth information and the target RGB image.

The classification result acquisition unit 500 is specifically configured to: acquire three-dimensional coordinates of the obstacle in the rectangular region, and acquire a relative depth value of the obstacle relative to the binocular camera; acquire a width and a height of the obstacle in a world coordinate system in accordance with a disparity map in the rectangular region and the relative depth value, so as to acquire a real width and a real height of the obstacle; and compare the real width and the real height of the obstacle with pre-stored data, select a category in candidate categories matching the pre-stored data as the classification result, and output the classification result. The candidate categories are acquired through: acquiring RGB-D data about the obstacle in accordance with the relative depth value of the obstacle; splicing the RGB-D data about the obstacle into a tensor with four channels, and adjusting a resolution of the RGB-D image to be a resolution matching a classification model to complete channel fusion; and outputting a confidence level of each category with respect to each obstacle, ranking the confidence levels, and selecting the categories with first two confidence levels as the candidate categories.

The classification model includes: an input layer with input dimensions of width*height*the quantity of channels, each of the width and the height being 64, and the quantity of channels being 4; a feature extraction backbone network configured to extract a feature; and a classifier configured to recognize the categories, the categories including large-size vehicle, medium-size vehicle, small-size vehicle, cyclist and pedestrian. The feature extraction backbone network is resnet18, and the classifier is softmax.

In order to improve an image effect, prior to splicing the RGB-D data about the obstacle into the tensor with four channels and adjusting the resolution of the RGB-D image to be the resolution matching the classification model to complete channel fusion, the relative depth value of the obstacle and the color channel are converted into 8-bit data, so as to perform normalization on a depth map.

According to the system in the embodiments of the present disclosure, the original image is collected through the binocular camera within the target range, so as to acquire the disparity map of the original image. Next, the color-calibrated RGB image is collected through the reference camera of the binocular camera within the target range. Next, the obstacle target is acquired through disparity clustering in accordance with the disparity map and the color-calibrated RGB image, and the target disparity map and the target RGB image of the obstacle target are acquired. Next, the depth information about the obstacle target is calculated in accordance with the target disparity map. Then, the classification result of the obstacle target is acquired through RGB-D channel information fusion in accordance with the depth information and the target RGB image. In this way, the RGB image and the depth information are fused and inputted into the classification model, so as to prevent the failure of the classification model in a special scenario, and improve the robustness of the classification model. In addition, the categories are selected in accordance with a similarity level between an apriori size and a spatial size of the obstacle, so it is able to further prevent the pedestrian and vehicle from being recognized erroneously, thereby to solve the problem in the related art where the recognition effect and the recognition accuracy are deteriorated in a special light environment.

The present disclosure further provides in some embodiments an intelligent terminal, including a data collection device, a processor and a memory. The data collection device is configured to collect data, the memory is configured to store therein one or more program instructions, and the processor is configured to execute the one or more program instructions for implementing the above-mentioned method.

The present disclosure further provides in some embodiments a computer-readable storage medium storing therein one or more program instructions for implementing the above-mentioned method.

In the embodiments of the present disclosure, the processor may be an integrated circuit (IC) having a signal processing capability. The processor may be a general-purpose processor, a Digital Signal Processor (DSP), an Application Specific Integrated Circuit (ASIC), a Field Programmable Gate Array (FPGA) or any other programmable logic element, discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as a Random Access Memory (RAM), a flash memory, a Read-Only Memory (ROM), a Programmable ROM (PROM), an Electrically Erasable PROM (EEPROM), or a register. The processor may read information stored in the storage medium so as to implement the steps of the method in conjunction with the hardware.

The storage medium may be a memory, e.g., a volatile, a nonvolatile memory, or both.

The nonvolatile memory may be an ROM, a PROM, an EPROM, an EEPROM or a flash disk.

The volatile memory may be an RAM which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM).

The storage medium in the embodiments of the present disclosure intends to include, but not limited to, the above-mentioned and any other appropriate memories.

It should be appreciated that, in one or more examples, the functions mentioned in the embodiments of the present disclosure may be achieved through hardware in conjunction with software. For the implementation, the corresponding functions may be stored in a computer-readable medium, or may be transmitted as one or more instructions on the computer-readable medium. The computer-readable medium may include a computer-readable storage medium and a communication medium. The communication medium may include any medium capable of transmitting a computer program from one place to another place. The storage medium may be any available medium capable of being accessed by a general-purpose or special-purpose computer.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An RGB-D fusion information-based obstacle target classification method, comprising:
    collecting an original image through a binocular camera within a target range, and acquiring a disparity map of the original image;
    collecting a color-calibrated RGB image through a reference camera of the binocular camera within the target range;
    acquiring an obstacle target through disparity clustering in accordance with the disparity map and the color-calibrated RGB image, and acquiring a target disparity map and a target RGB image of the obstacle target;
    calculating depth information about the obstacle target in accordance with the target disparity map; and
    acquiring a classification result of the obstacle target through RGB-D channel information fusion in accordance with the depth information and the target RGB image.

2. The RGB-D fusion information-based obstacle target classification method according to claim 1, wherein the acquiring the obstacle target through disparity clustering in accordance with the disparity map and the color-calibrated RGB image comprises:
    selecting active disparity points in the disparity map;
    calculating a disparity value of each active disparity point; and
    acquiring a rectangular region for the obstacle target in accordance with an aggregation level of the disparity values.

3. The RGB-D fusion information-based obstacle target classification method according to claim 2, wherein the acquiring the classification result of the obstacle target through RGB-D channel information fusion in accordance with the depth information and the target RGB image comprises:
    acquiring three-dimensional coordinates of the obstacle in the rectangular region, and acquiring a relative depth value of the obstacle relative to the binocular camera;
    acquiring a width and a height of the obstacle in a world coordinate system in accordance with a disparity map in the rectangular region and the relative depth value, so as to acquire a real width and a real height of the obstacle; and
    comparing the real width and the real height of the obstacle with pre-stored data, selecting a category in candidate categories matching the pre-stored data as the classification result, and outputting the classification result.

4. The RGB-D fusion information-based obstacle target classification method according to claim 3, wherein the candidate categories are acquired through:

acquiring RGB-D data about the obstacle in accordance with the relative depth value of the obstacle;

splicing the RGB-D data about the obstacle into a tensor with four channels, and adjusting a resolution of the RGB-D image to be a resolution matching a classification model to complete channel fusion; and outputting a confidence level of each category with respect to each obstacle, ranking the confidence levels, and selecting the categories with first two confidence levels as the candidate categories.

5. The RGB-D fusion information-based obstacle target classification method according to claim 4, wherein the classification model comprises:

an input layer with input dimensions of width*height*the quantity of channels, each of the width and the height being 64, and the quantity of channels being 4;

a feature extraction backbone network configured to extract a feature; and a classifier configured to recognize the categories, the categories comprising large-size vehicle, medium-size vehicle, small-size vehicle, cyclist and pedestrian.

6. The RGB-D fusion information-based obstacle target classification method according to claim 5, wherein the feature extraction backbone network is resnet18, and the classifier is softmax.

7. The RGB-D fusion information-based obstacle target classification method according to claim 4, wherein prior to splicing the RGB-D data about the obstacle into the tensor with four channels and adjusting the resolution of the RGB-D image to be the resolution matching the classification model to complete channel fusion, the RGB-D fusion information-based obstacle target classification method further comprises converting the relative depth value of the obstacle and the color channel into 8-bit data, so as to perform normalization on a depth map.

8. An RGB-D fusion information-based obstacle target classification system for implementing the RGB-D fusion information-based obstacle target classification method according to claim 1, comprising:

a disparity map acquisition unit configured to collect an original image through a binocular camera within a target range, and acquire a disparity map of the original image;

an RGB image acquisition unit configured to collect a color-calibrated RGB image through a reference camera of the binocular camera within the target range;

an obstacle determination unit configured to acquire an obstacle target through disparity clustering in accordance with the disparity map and the color-calibrated RGB image, and acquire a target disparity map and a target RGB image of the obstacle target;

a depth information acquisition unit configured to calculate depth information about the obstacle target in accordance with the target disparity map; and a classification result acquisition unit configured to acquire a classification result of the obstacle target through RGB-D channel information fusion in accordance with the depth information and the target RGB image.

9. An intelligent terminal, comprising a data collection device, a processor and a memory, wherein the data collection device is configured to collect data, the memory is configured to store therein one or more program instructions, and the processor is configured to execute the one or more program instructions for implementing the RGB-D fusion information-based obstacle target classification method according to claim 1.

10. A computer-readable storage medium storing therein one or more program instructions for implementing the RGB-D fusion information-based obstacle target classification method according to claim 1.

* * * * *